(12) United States Patent
Campbell et al.

(10) Patent No.: US 12,039,955 B2
(45) Date of Patent: Jul. 16, 2024

(54) METHODOLOGY FOR IMAGE SYNCHRONIZATION TO VIDEO IMAGING DEVICES

(71) Applicant: Rockwell Collins, Inc., Cedar Rapids, IA (US)

(72) Inventors: Thomas B. Campbell, Cedar Rapids, IA (US); Ke You Teh, Cedar Rapids, IA (US); Dean C. Karl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 76 days.

(21) Appl. No.: 17/692,036

(22) Filed: Mar. 10, 2022

(65) Prior Publication Data

US 2023/0290322 A1 Sep. 14, 2023

(51) Int. Cl.
*G09G 5/12* (2006.01)
*G09G 5/00* (2006.01)
*H04N 5/04* (2006.01)

(52) U.S. Cl.
CPC .............. *G09G 5/12* (2013.01); *G09G 5/005* (2013.01); *G09G 2300/026* (2013.01); *G09G 2340/0435* (2013.01); *G09G 2360/04* (2013.01)

(58) Field of Classification Search
CPC .. G09G 3/00; G09G 3/20; G09G 3/36; G09G 5/00; G09G 5/04; G09G 5/12; G09G 5/18;
(Continued)

(56) References Cited

U.S. PATENT DOCUMENTS 6,181,300 B1 1/2001 Poon et al.
7,859,542 B1 12/2010 Williams et al.
(Continued)

FOREIGN PATENT DOCUMENTS

CN 103118247 A 5/2013
JP 201116615 A 8/2011

OTHER PUBLICATIONS

Extended European Search Report dated Apr. 26, 2023, European Application No. 23160553.6.

*Primary Examiner* — Chanh D Nguyen
*Assistant Examiner* — Nguyen H Truong
(74) *Attorney, Agent, or Firm* — Suiter Swantz IP

(57) ABSTRACT

A system and method for synchronizing two or more display elements of a multiple element display, is disclosed. The method includes embedding a frame count signal into the blanking portion of a video frame for each data stream received by the multiple display elements. Upon displaying the pixel data from a video frame, a frame count signal containing an identifying frame count is transmitted back to the computer. The computer compares the frame count signals to determine if the multiple display elements are synchronized. Upon a determination that the multiple display elements are not synchronized, the data stream for one or more display elements are adjusted accordingly. The system may be configured as a federated system with two or more computers each communicatively coupled to each display element in a hierarchal system, where a secondary computer can control a display element if the primary computer or primary computer link fails.

6 Claims, 6 Drawing Sheets

(58) Field of Classification Search
CPC ..... G06F 3/01; G06F 3/14; G06F 3/20; G06F 3/147; G06F 15/16; G06F 15/80; H04L 7/00; H04L 69/28; H04N 5/04; H04N 5/05; H04N 5/073; H04N 5/247; H04N 5/335; H04N 5/935; H04N 5/45; H04N 5/445; H04N 7/01; H04N 7/169; H04N 9/475; H04N 19/17; H04N 19/70; H04N 19/176; H04N 19/52; H04N 19/172; H04N 19/146; H04N 19/36; H04N 21/41; H04N 21/43; H04N 21/262; H04N 21/845; H04N 21/242; H04N 21/426; H04N 21/239; H04N 21/437; H04N 21/414; H04N 21/462; H04N 21/2343; H04N 21/2365

See application file for complete search history.

(56) References Cited

U.S. PATENT DOCUMENTS

| | | | |
|---|---|---|---|
| 8,487,834 | B2 | 7/2013 | Naito et al. |
| 9,055,275 | B2 | 6/2015 | Maruyama et al. |
| 9,741,316 | B2 | 8/2017 | Loeffler et al. |
| 10,129,500 | B2 | 11/2018 | Masumoto |
| 2003/0058136 | A1 | 3/2003 | Hedrick |
| 2007/0046680 | A1* | 3/2007 | Hedrick ................. G01C 23/00 345/503 |
| 2011/0261034 | A1* | 10/2011 | Tsuchida ............... G09G 3/3659 345/204 |
| 2012/0050613 | A1 | 3/2012 | Fretay et al. |
| 2012/0075334 | A1* | 3/2012 | Pourbigharaz ........ G06F 3/1438 345/619 |
| 2013/0187832 | A1 | 7/2013 | Song |
| 2014/0029910 | A1* | 1/2014 | Maruyama ....... H04N 21/43074 386/220 |
| 2015/0138038 | A1 | 5/2015 | Nam et al. |
| 2016/0357493 | A1 | 12/2016 | Zerwas |
| 2017/0134690 | A1* | 5/2017 | Masumoto ............ G06F 3/1438 |
| 2019/0286115 | A1* | 9/2019 | Wang ....................... G09G 5/14 |
| 2020/0335062 | A1 | 10/2020 | Huard et al. |
| 2021/0294558 | A1 | 9/2021 | Griffin |
| 2021/0313044 | A1* | 10/2021 | Shibata ................. G16H 30/20 |
| 2022/0375384 | A1* | 11/2022 | Lee ........................ G09G 5/003 |

\* cited by examiner

| | | 8 | 9 | 10 | 11 | 12 | 13 | 14 | 15 | 16 |
|---|---|---|---|---|---|---|---|---|---|---|
| 504 FRAME COUNT WORD SIZE | BITS | | | | | | | | | |
| 508 FRAME COUNT LIMIT | INCREMENTS | 256 | 512 | 1,024 | 2,048 | 4,096 | 8,192 | 16,384 | 32,768 | 65,536 |
| 512 FRAME UPDATE RATE | Hz | 60 | 60 | 60 | 60 | 60 | 60 | 60 | 60 | 60 |
| 516 FRAME UPDATE PERIOD | SECONDS | 0.0167 | 0.0167 | 0.0167 | 0.0167 | 0.0167 | 0.0167 | 0.0167 | 0.0167 | 0.0167 |
| 520 FRAME COUNT ROLLOVER TIME | SECONDS | 4.267 | 8.533 | 17.1 | 34.1 | 68.3 | 136.5 | 273.1 | 546.1 | 1,092.3 |
| | MINUTES | N/A | N/A | N/A | N/A | 1.1 | 2.3 | 4.6 | 9.1 | 18.2 |

METHODOLOGY FOR IMAGE SYNCHRONIZATION TO VIDEO IMAGING DEVICES

BACKGROUND

Large Area Displays (LADs), such as those used in the cockpits of aircraft, are often configured as two or more independent displays, or display elements, implemented on a common substrate. LADs do not have a break or mullion between these independent displays, allowing seamless imagery to be presented on the LAD, with different portions of the visual signal sent to each independent display simultaneously and synchronously to each other. Because each independent display has a specific driver delivering the specific portion of each image, the images from these independent displays may occasionally become asynchronous, where one independent display is a few frames in front of, or behind, another display. This is particularly true in federated systems where a LAD may couple to multiple computers, each capable of driving signals to one or more independent displays. An LAD with asynchronous independent displays will present an unpleasant jittering image to the user. Resetting an LAD may involve restarting the LAD system, which may be impractical or impossible during flight. Therefore, it is desirable to provide a system or method that checks for and resolves LAD asynchronicity.

SUMMARY

A system is disclosed. In one or more embodiments, the system includes a display configured to display an image. In one or more embodiments, the display includes a first display element communicatively coupled to a first computer. In one or more embodiments, the first display element is configured to receive a first video signal of a first video stream. In one or more embodiments, the first video stream includes first pixel data and first frame count data. In one or more embodiments, the first display element is further configured to transmit the first frame count data. In one or more embodiments, the display includes a second display element coupled to the first computer. In one or more embodiments, the second display element is configured to receive a second video signal of a second video stream. In one or more embodiments, the second video signal includes second pixel data and second frame count data. In one or more embodiments, the second display element is configured to transmit the second frame count data. In one or more embodiments, the first frame count data is correlated to the second frame count data. In one or more embodiments, the first pixel data and the second pixel data comprise image data that, when imaged on the display and the first frame count data and the second frame count data are equivalent, displays the image. In one or more embodiments, the system includes a first computer that includes one or more processors and a memory. In one of more embodiments, the memory includes instructions stored thereon. In one or more embodiments, the instructions, upon execution by the one or more processors, cause the one or more processors to generate the first video signal and the second video signal, transmit the first video signal to the first display element, transmit the second video signal to the second display element, receive the first frame count data from the first display element, receive the second frame count data from the second display element; compare the first frame count data to the second frame count data, and adjust at least one of the first video stream or the second video stream if the first frame count data and the second frame count data are not equivalent.

In some embodiments of the system, the system further includes a second computer communicatively coupled to the first display element and the second display element. In one or more embodiments, the second computer is configured to: transmit the first video signal to the first display element; transmit the second video signal to the second display element, receive the first frame count data from the first display element; and receive the second frame count data from the second display element. In one or more embodiments, the system further includes a cross-talk bus configured to communicatively couple the first computer to the second computer In some embodiments, first video signal is configured to arrange into a first frame. In one or more embodiments, the first frame includes an active pixel area configured to include the first pixel data, and a blanking region configured to include the first frame count data.

In some embodiments, the blanking region comprises: a horizontal back porch, a horizontal front porch, a vertical front porch; and, a vertical back porch. In one or more embodiments, the first frame count data is included in at least one of the horizontal back porch, the horizontal front porch, the vertical front porch, or the vertical back porch.

In one or more embodiments, the first blanking region includes a vertical back porch that includes the first frame count data.

In some embodiments, wherein the frame count data includes a frame number.

In some embodiments, the frame number is based on an 8-bit frame count word size.

In some embodiments, the system is configured to utilize a ARINC 818 or SMPTE 292M video format.

In some embodiments, the system further includes spectacles configured with optical shutters synchronized with the first display element and the second display element. In some embodiments, the spectacles are further configured to confer a three-dimensional image to a user based on a synchronicity of the optical shutters with the first display element and the second display element.

In some embodiments, the second computer is activated upon a malfunction of the first computer.

A method to synchronize a display configured with two display elements is also disclosed. In one or more embodiments, the method includes generating first pixel data for a frame of a first video signal and second pixel data for a frame of a second video signal. In one or more embodiments, the first video signal and the second video signal are synchronized. In one or more embodiments, the method further includes storing synchronized frame count data into a blanking region of each frame. In one or more embodiments, the method further includes transmitting the first video signal to a first display element and the second video signal to a second display element. In one or more embodiments, the method further includes displaying the pixel data on the first display element and the second display element. In one or more embodiments, the method further includes transmitting the frame count signals from the first display element and the second display element to a first computer or second computer. In one or more embodiments, the method further includes comparing the frame count data and determining if the first display element and the second display elements are synchronous. In one or more embodiments, the method further includes adjusting at least one of a first video stream or a second video stream if the first display element and the second display element are not synchronous.

In some embodiments of the method, the blanking region comprises a horizontal back porch, a horizontal front porch, a vertical front porch, and a vertical back porch. In one or more embodiments, the first frame count data is included in at least one of the horizontal back porch, the horizontal front porch, the vertical front porch, or the vertical back porch.

In some embodiments of the method, comparing frame count data includes comparing frame count data received on the first computer with frame count data received on the second computer.

In some embodiments of the method, the second computer is activated upon a malfunction of the first computer.

In some embodiments of the method, the method further includes synchronizing the first display element and the second display element to a pair of optical shutters.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5 illustrates a table describing a set of data parameters based on the number of bits used to store a frame count number, in accordance with one or more embodiments of the disclosure.

DETAILED DESCRIPTION

Figure 1:
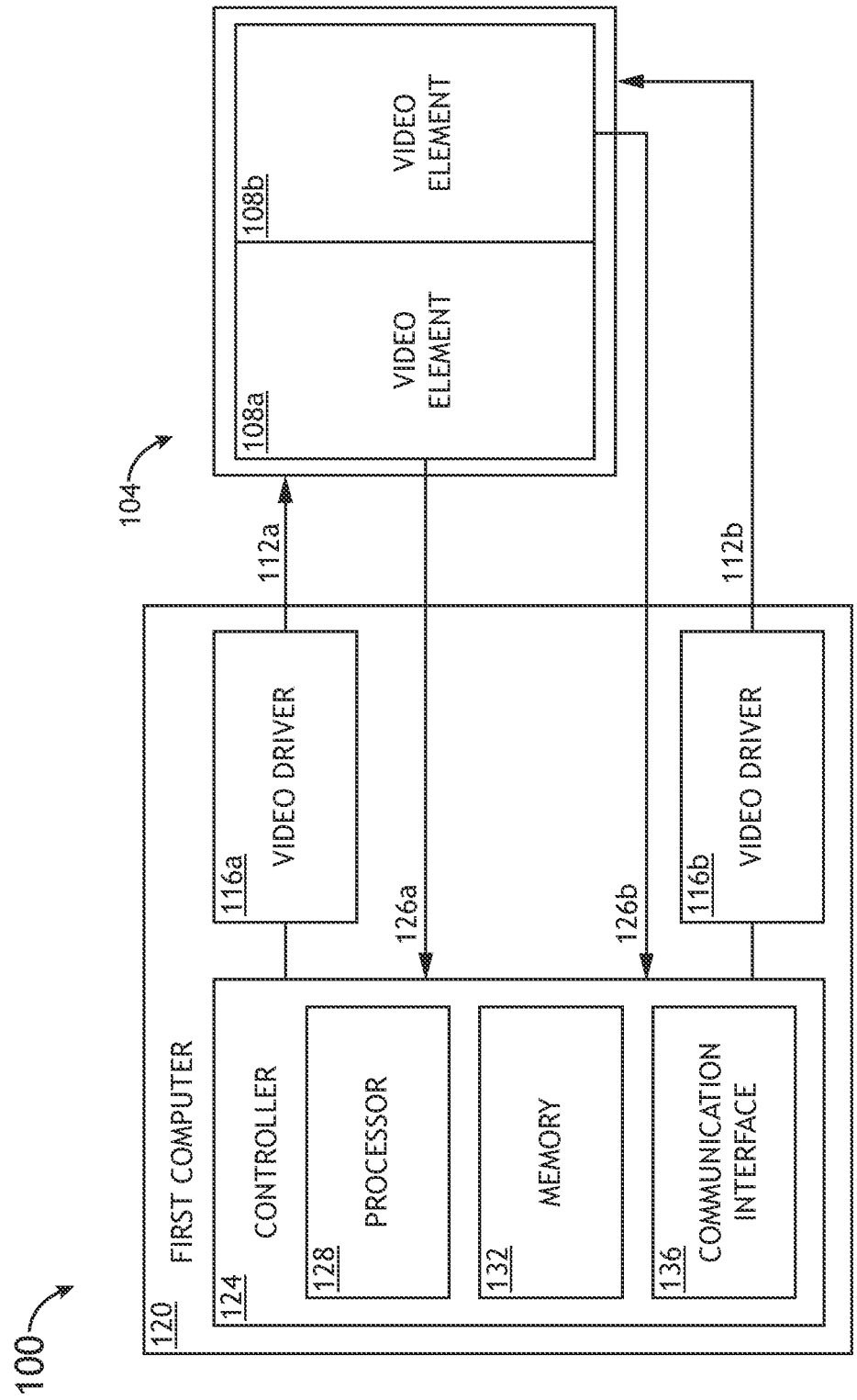
FIG. 1 is a block diagram of a system for synchronizing video streams on a display configured with multiple display elements, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for synchronizing independent display elements within an LAD is disclosed. The system includes at least one processor that drives two or more independent video streams to two or more independent display elements, with the video streams together capable of forming a whole image. Before the video signal of the video streams are sent to each display element, frame count data is embedded into each frame of video. Once the video stream is displayed, the frame count data from all of the displays are sent back to at least one of the processors. The frame count data is then compared to ensure that the displayed images are synchronized. If the frame count data determines that the displayed images are not synchronized, then the system will adjust the video streams of one or more of the display elements accordingly.

FIG. 1 is a block diagram of a system 100 for synchronizing video streams on a display 104 configured with multiple display elements (a first display element 108a and a second display element 108b), in accordance with one or more embodiments of the disclosure. The first display element 108a and the second display element 108b each receive a portion of the video stream in the form of video signals (e.g., a first video signal 112a and a second video signal 112b, respectively) from a respective video driver 116a-b of a first computer 120 (e.g., a primary computer). The first computer 120 includes a controller 124 configured to provide processing functionality for the system 100, including generating and/or modifying the video stream sent by each video driver 116a-b. As each frame of the video stream is being displayed on the first display element 108a and the second display element 108b, a respective return data signal (e.g., a first frame count signal 126a and a second frame count signal 126b) is sent from the first display element 108a and the second display element 108b to the controller 124. The controller 124 includes one or more processors 128, memory 132, and a communication interface 136.

The one or more processors 128 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 128 may include any device configured to execute algorithms and/or instructions (e.g., program instructions stored in memory). In one embodiment, the one or more processors 128 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 132 can be an example of tangible, computer-readable storage medium that provides storage functionality to store various data and/or program code associated with operation of the controller 124 and/or other components of the system 100, such as software programs and/or code segments, or other data to instruct the controller and/or other components to perform the functionality described herein. Thus, the memory 132 can store data, such as a program of instructions for operating the system 100 or other components. It should be noted that while a single memory 132 is described, a wide variety of types and combinations of memory 132 (e.g., tangible, non-transitory memory) can be employed. The memory 132 can be integral with the controller, can comprise stand-alone memory, or can be a combination of both. Some examples of the memory 132 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 136 can be operatively configured to communicate with components of the controller 124 and other components of the system 100. For example, the communication interface 136 can be configured to retrieve data from the controller 124 or other components, transmit data for storage in the memory 132, retrieve data from storage in the memory 132, and so forth. The communication interface 136 can also be communicatively coupled with controller 124 and/or system elements to facilitate data transfer between system components.

The display 104 may be formed of any type of display elements 108a-b including but not limited to a liquid crystal display (LCD) (e.g., a light-emitting diode (LED) backlit LCD, a thin-film resistor (TFT) LCD, or a quantum dot (OLED) display), an LED display (e.g., organic light-emitting diode (OLED) display, or active-matrix OLED (AMO-LED)) display, a cathode ray tube display, a digital light processing (DLP) display, a plasma display panel (PDP), or a microLED display. The display 104 may be configured as any size or shape. For example, the display 104 may be configured as a large area displays (LAD). For instance, the display 104 may be configured as an LAD used in aircraft cockpits.

The display 104 may include have any number of video elements 108. For example, the display 104 may include two video elements 108. In another example, the display 104 may include four video elements 108. In another example, the display 104 may include 8 video elements 108. The system 100 itself may include any number of displays 104. For example, the system 100 may include two displays 104 (e.g., for both a pilot and a co-pilot), In another example, the system 100 may include 100 displays (e.g., for each passenger).

Figure 2:
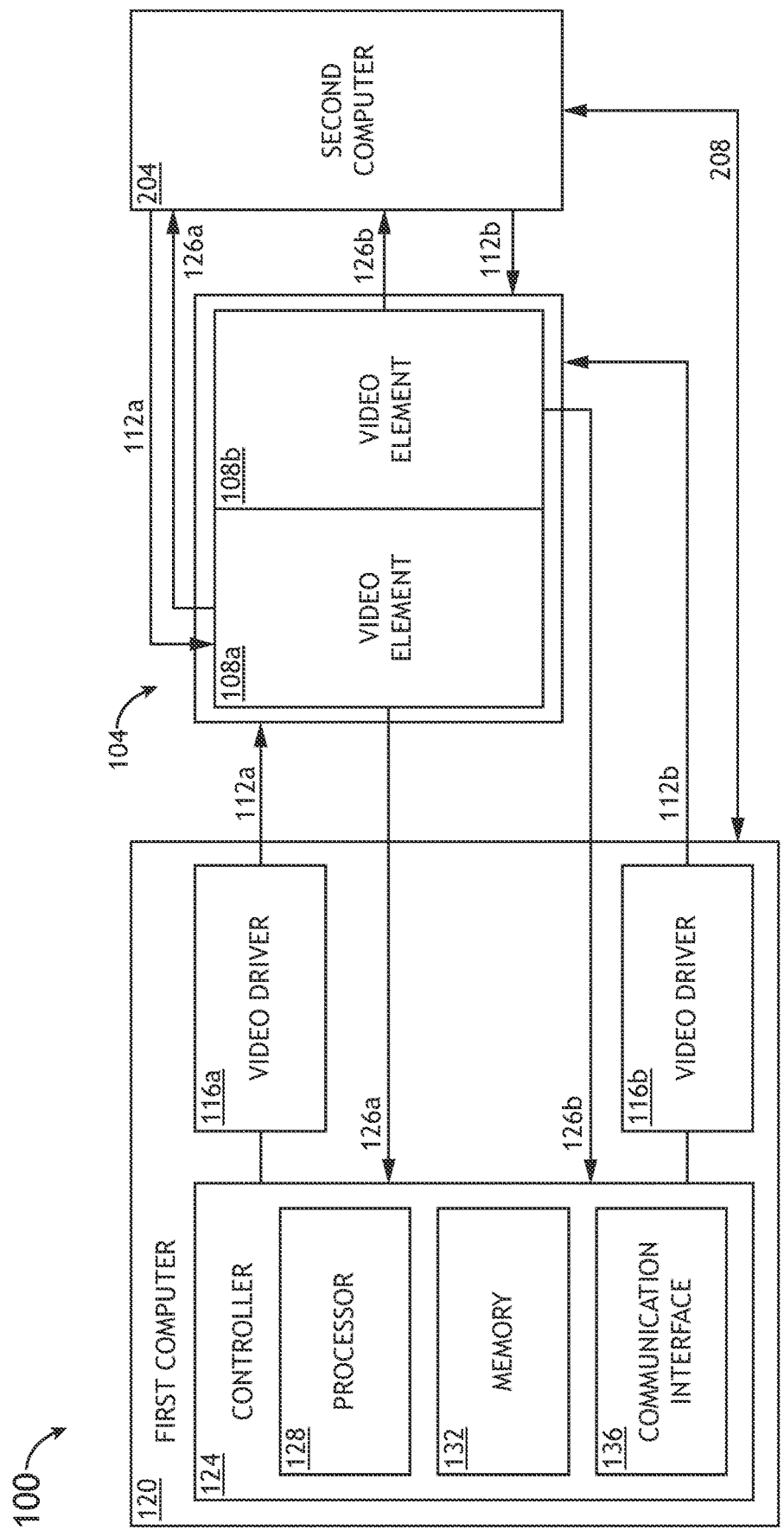
FIG. 2 is a block diagram of a system for synchronizing video streams on a display configured with multiple display elements using a first computer and a second computer in accordance with one or more embodiments of the disclosure.

FIG. 2 is a block diagram of a system 200 for synchronizing video streams on a display 104 configured with multiple display elements 108a-b using a first computer 120 and a second computer 204 (e.g., secondary computer) in accordance with one or more embodiments of the disclosure. The system 200 may include one or more, or all components of the system 100 and vice versa. For example, the second computer 204 may be configured with one or more, or all, components of the first computer 120 including but not limited to a controller 124 (e.g., with one or more processors 128, memory 132, and a communication interface 136), and video drivers 116a-b. The second computer 204 may also be configured to perform one or more, or all the functions of the first computer 120 and vice-versa. For example, the second computer 204 may be configured to transmit the first video signal 112a and the second video signal 112b to the respective display elements 108a-b, as well as receive the respective frame count signals 126 a-b from the respective display elements 108a-b.

In embodiments, the system 200 further includes a cross talk bus 208 configured to communicatively couple the first computer 120 to the second computer 204, and configured to synchronize communication signals so that both the first computer 120 and the second computer 204 are capable of driving the same video signals to the specific display elements 108a-b. The cross-talk bus 208 may utilize any type of communication medium (e.g., ethernet cable) or protocol to transfer data between the first computer 120 and the second computer 204. In this manner, the system 200 is configured as a federated and/or hierarchal computer system, with multiple display elements 108a-b each under control by a redundant set of computers 120, 204. For example, if the display 104 is initially under control of the first computer 120 (e.g., the primary computer), and the communication between the first computer 120 and the first display element 108a is subsequently severed, the second computer 204 can take over, with communication along the cross-talk bus 208 ensuring that each display element 108a-b is receiving a signals, and that the signal is synchronized with the rest of the display 104 (e.g., the second computer is activated (e.g., performing the functions of the first computer) upon a malfunction of the first computer.)

Figure 3:
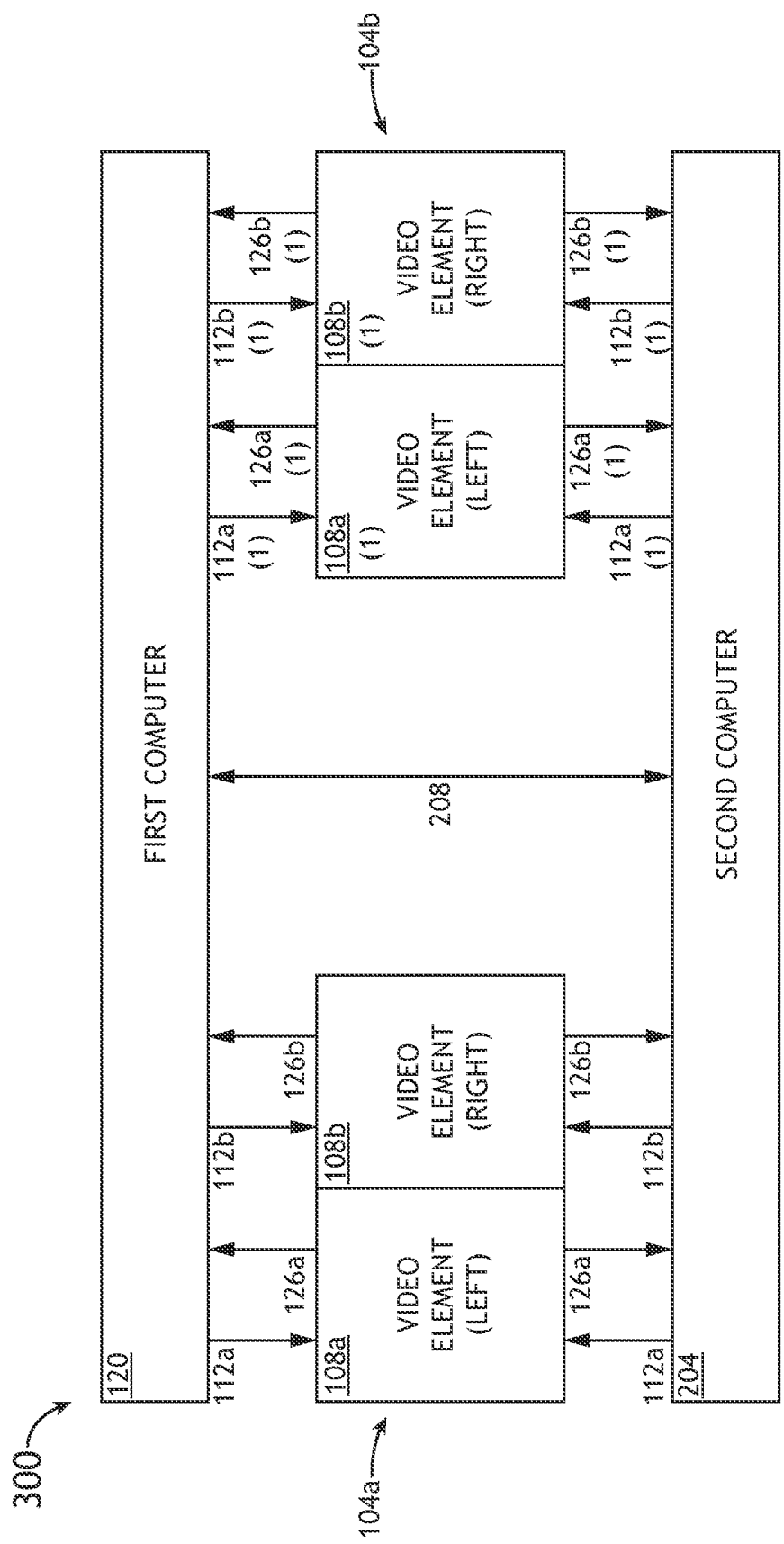
FIG. 3 is a block diagram of a system illustrating the organization of signals sent between two displays the first computer, and the second computer, in accordance with one or more embodiments of the disclosure.

FIG. 3 is a block diagram of a system 300, illustrating the organization of signals sent between two displays 104a-b, the first computer 120, and the second computer 204, in accordance with one or more embodiments of the disclosure. System 300 may include one or more, or all components of systems 100, 200, and vice versa. Display 104a includes video elements 108a-b, each receiving respective video signals 112 a-b from the first computer 120 and the second computer 204. The video elements 108a-b also transmit respective frame count signals 126a-b to the first computer 120 and the second computer 204. Concurrently, display 104b includes video elements 108a(1) 108b(1), each receiving respective video signals 112a(1), 112b(1) from the first computer 120 and the second computer 204. The video elements 108a(1) 108b(1), also transmit respective frame count signals 126a(1), 126b(1) to the first computer 120 and the second computer 204.

Each display 104a-b may receive identical or nonidentical video signals 112 a-b, 112a(1), 112b(1), depending on the circumstance or environment of the system 300. For example, the video signals 112 a-b, 112a(1), 112b(1) sent to the displays 104a-b of a pilot and copilot (e.g., such as for presenting navigation information) may be identical, requiring that the first computer 120 and the second computer 204 not only ensure that the video elements 108a-b, 108a(1), 108b(1) within each display 104a-b are synchronized, but also that the displays 104a-b themselves are synchronized. For systems 100 with displays 104a-b used for multiple purposes (e.g., each display 104a-b displaying different video streams), the system 300 may only need to ensure that video elements 108a-b, 108a(1), 108b(1) within each display 104a-b are synchronized.

As described herein, the first computer 120 may be designated as a primary computer. That is, the video signals 112 a-b, 112a(1), 112b(1) sent to the displays 104a-b are initially transmitted from the first computer 120, with the second computer only sending signals to the one or more displays 104a-b when a fault or error has been detected. The designation of the first computer 120 as the primary computer may not be a permanent setting. For example, the second compute 204 may be configured as the primary computer. In another example, the first computer 120 and second computer 204 may act as a primary computer for specific displays 104a-b or specific video elements 108a-b, 108a(1), 108b(1). For instance, the first computer 120 may act as the primary computer for one display 104a, while the second computer 204 may act as the primary computer for the other display 104b. Therefore, the above description should not be interpreted as a limitation on the embodiments of the present disclosure but merely as an illustration.

In embodiments, the video signals 112 a-b, 112a(1), 112b(1) contain pixel data and frame count data. Pixel data includes data to be imaged on the display 104a-b. Frame count data includes a frame identification and/or a frame number that is sent from the displays 104a-b to the first computer 120 and second computer 204 as frame count signals 126a-b, 126a(1), 126b(1).

Figure 4:
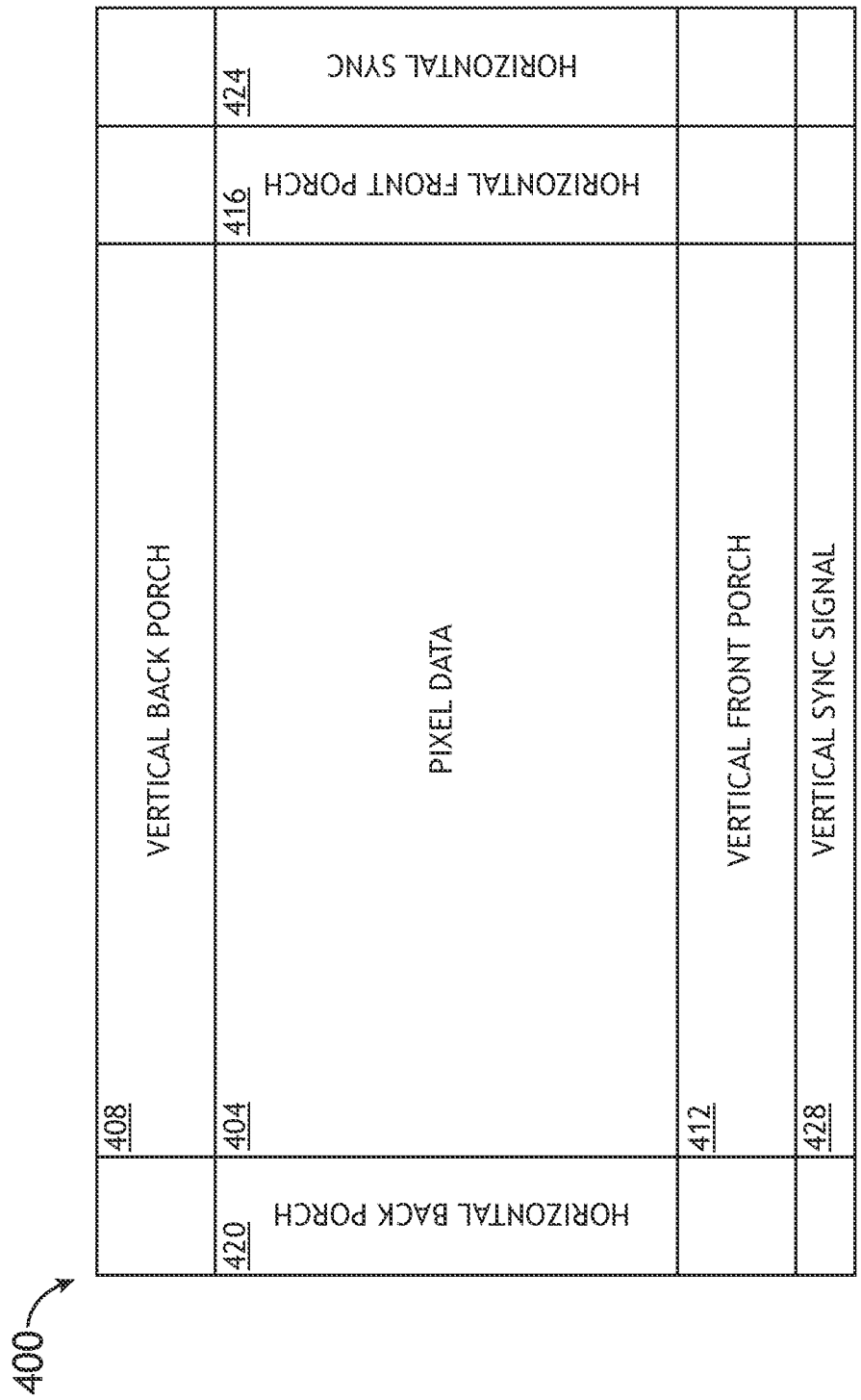
FIG. 4 is a diagram of a video frame based on a received video signal of a video stream, in accordance with one or more embodiments of the disclosure.

FIG. 4 is a diagram of a frame 400 based on a received video signal 112 a-b, 112a(1), 112b(1) of a video stream, in accordance with one or more embodiments of the disclosure (e.g., the data from the video stream is arranged into a frame form). The pixel data 404 accounts for the majority of the data, or area, used within the video frame, and is often referred to as the active pixel area (e.g., the first active pixel area). Surrounding the pixel data 404 are non-visualized data fields used for ensuring correct placement and synchronization of the pixel data. This "blanking region" includes: a vertical back porch 408 and a vertical front porch 412, used to ensure correct vertical placement of the pixel data 404 on the display 104a-b; a horizontal front porch 416 and a horizontal back porch 420, used to ensure correct horizontal of the pixel data 404 on the display 104a-b; and a horizontal synchronizing signal 424 and a vertical synchronizing signal 428 used for timing. The vertical synchronization signal 428 indicates that a frame 400 of video has ended and the next data received will be the start of a new frame 400. The horizontal synchronizing signal 424 indicates that a row of data has ended and the next data received will be the start of a new row.

Blanking regions has been used for several decades for ensuring correct placement of pixel data on a display 104a-b. While data within these blanking regions are required for correct pixel data placement and timing, some blanking regions contain data content that is not critical for function. This 'filler' data provides space in a buffer region that assists in pixel data placement, but may not need to be critical coding data. This filler space within the blanking regions may then be used to add data necessary for synchronizing the display elements 108a-b, 108a(1), 108b(1). The vertical back porch 408, the vertical front porch 412, the horizontal front porch 416, and the horizontal back porch 420 in particular contain storage space where frame count data (e.g., frame identification and/or frame count) can be stored/embedded pre-transmittal by the first computer 120 and/or second computer 204. For example, the first computer 120 may write the frame count number onto the vertical back porch. Upon receiving the video signals 112 a-b, 112a(1), 112b(1) containing the stored frame count data, the displays 104a-b may then transmit the frame count data as frame count signals 126a-b, 126a(1), 126b(1) back to the first computer 120 and/or second computer 204. The received frame count data may then be processed to determine whether the frames 400 displayed by the display elements 108a-b, 108a(1), 108b(1) are in sync.

The amount of storage space required to store frame count data is dependent on the number of frames 400 that need to be labeled with a frame identifier or frame count number. The number of frames 400 that need to be labeled is also dependent on the rate that frames 400 are displayed and the potential time interval system 300 may become out of sync. FIG. 5 illustrates a table 500 describing a set of data parameters based on the number of bits (e.g., frame count word size 504) used to store the frame count number, in accordance with one or more embodiments of the disclosure. For example, a frame count system with an 8-bit frame count word size has a frame count limit 508 of 256 frames (e.g., one frame labeled with a specific binary number in an 8-bit system). By considering a commonly used frame update rate 512 of 60 hz, or conversely, a 0.0167 s frame update period 516, a frame count rollover time 520 (e.g., the time for all 256 frames 400 of an 8-bit word count size 504 to be displayed) would be 4.267 seconds. Therefore, a system 300 that is rarely out of synchronization more than four seconds, could store a frame count word size of 8-bits for synchronizing display elements 108a-b, 108a(1), 108b(1).

The frame count word size 504 may be increased for any display system as needed. For example, the frame count word size 504 for the system 100 may range from 1-bit to 16 bits. For instance, for a system utilizing a 60 Hz frame update rate 512 and requiring a 10-minute frame count rollover time 520, a 16-bit system may be used, resulting in 65,536 frames 400 individually label with a specific frame count number, and offering a 10.2-minute frame count rollover time 520. In another instance, a display 104*a-b* with a 240 Hz update rate would require the use of a 10-bit frame count word size in order to individually label 1024 frames 400 with a specific frame count number, which would result in a 4.267 frame count rollover time 520.

The transmitting of the frame count data from the display 104*a-b* to the first computer 120 and/or second computer 204 can be performed using any type of data transmit componentry and/or protocol. For example, the frame count data may be outputted from the display elements 108*a-b*, 108*a*(1), 108*b*(1) at the same time that the pixel data 404 is displayed, and routed to the first computer 120 and/or second computer via an ethernet connection, or a USB connection (e.g., via the cross-talk bus 208). In some embodiments, the cross-talk bus 208 is configured as a wireless connection (e.g., using 5G, Bluetooth, WIFI, or other wireless technologies).

Once the first computer 120 and/or second computer 204 receive the frame count signal 126*a-b*, 126*a*(1), 126*b*(1), the first computer 120 and/or second computer may compare by themselves or in concert (e.g., via the cross-talk bus 208) the frame count for all display elements 108*a-b*, 108*a*(1), 108*b*(1) in the display 104*a-b* to ensure that the frame counts are equivalent. This comparison may also be extended to determine with individual displays 104*a-b* are also synchronized (e.g., determine if display 104*a* is synchronized with 104*b*).

If upon comparing the frame counts for the different display elements 108*a-b*, 108*a*(1), 108*b*(1), it is determined that the display elements 108*a-b*, 108*a*(1), 108*b*(1) are not correctly in sync, the first computer 120 and/or second computer 204 may alter the video stream to be sent to the one or more display elements 108*a-b*, 108*a*(1), 108*b*(1) so as to synchronize the display elements 108*a-b*, 108*a*(1), 108*b*(1). For example, for a display 104*a* that has one display element 108*a* that is two frames ahead of the other display element 108*b*, the first computer 120 may pause the one display element 108*a* for two frame update periods, synchronizing the display elements 108*a-b* to each other.

Figure 6:
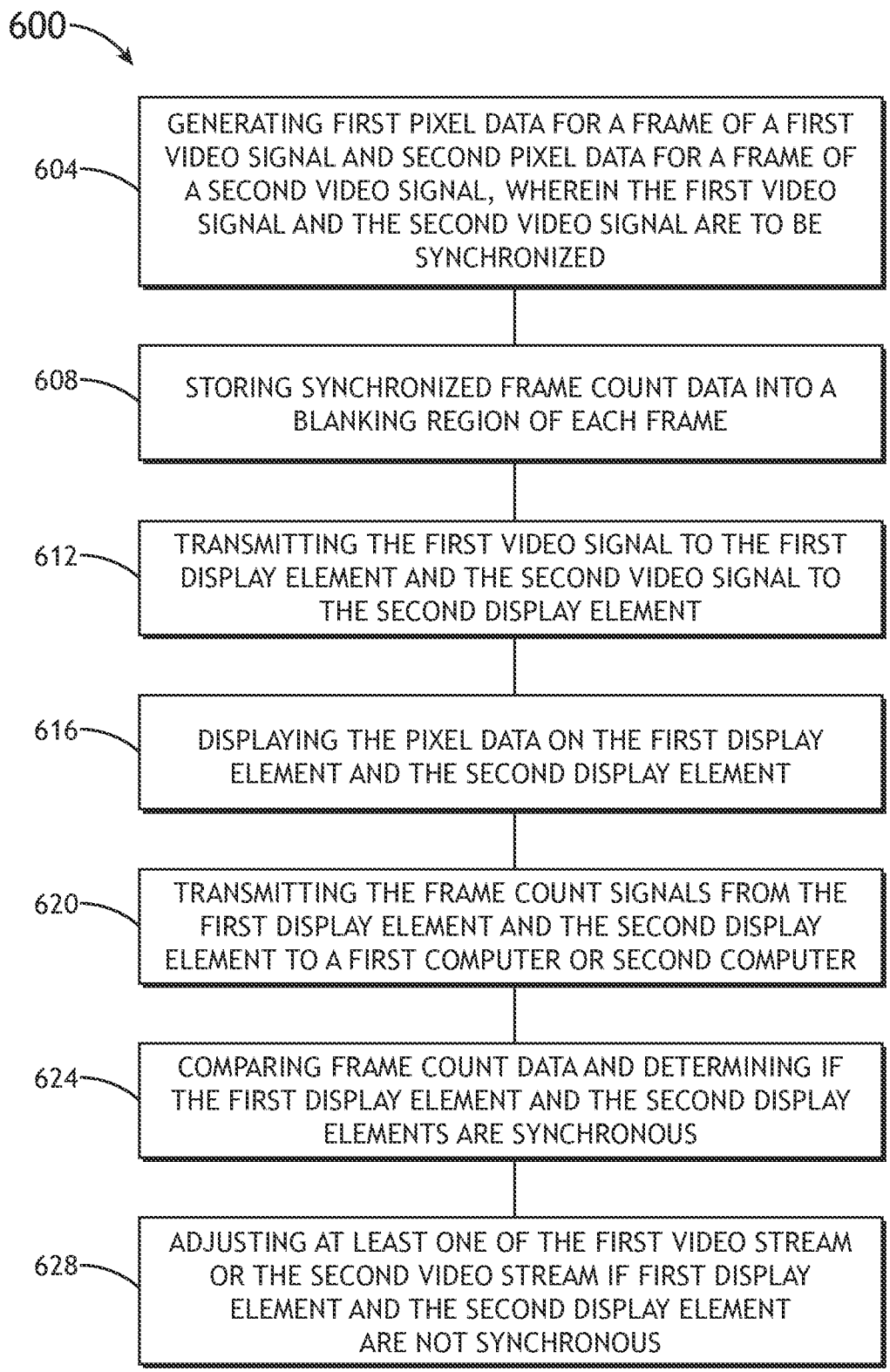
FIG. 6 illustrates a method for synchronizing a display configured with two display elements, in accordance with one or more embodiments of the disclosure.

FIG. 6 illustrates a method 600 for synchronizing a display 104 configured with two display elements 108*a-b*, in accordance with one or more embodiments of the disclosure. The method 600, or one or more steps of the method may be utilized by the system 100, 200, 300.

In some embodiments, the method 600 includes a step 604 of generating first pixel data for a frame of a first video signal 112*a* and second pixel data for a frame 400 of a second video signal 112*b*, wherein the first video signal 112*a* and the second video signal 112*b* are to be synchronized. The first pixel data and second pixel data contain the data to be imaged on the first display element 108*a* and the second display element 108*b*, respectively. For example, the first pixel data and the second pixel data may include navigation data that the first computer 120, or other system 300 component, receives from sensors and transformed into pixel data comprising frames 400.

In some embodiments, the method 600 further includes a step 608 of storing synchronized frame count data into the blanking region of each frame 400. For example, the first computer 120 and/or second computer 204 (e.g., or other system 300 component) may insert an 8-bit frame count number (e.g., 01010101) into one of the vertical back porch 408, vertical front porch 412, horizontal back porch 420, or horizontal from porch 416 of the blanking region of the frame 400. Importantly, the frame count data for each frame to be displayed on the first display element 108*a* and the second display element 108*b*. For example, a frame 400 to be displayed on the first display element 108*a* at the same time as a frame 400 to be displayed on the second display element 108*b* would have identical frame counts (e.g., the first frame count data and the second frame count data is correlated), and be stored in the blanking region of each specific frame.

In some embodiments, the method 600 further includes a step 612 of transmitting the first video signal 112*a* to the first display element 108*a*, and the second video signal 112*b* to the second display element 108*b*. Either the first computer 120 or the second computer 204 can send either the first video signal 112*a* or the second video signal 112*b* to the respective display element 108*a-b*.

In some embodiments, the method further includes a step 616 of displaying the pixel data on a display 104*a-b*. The displayed pixel data (e.g., comprising the first pixel data from the first display element 108*a* and the second pixel data from the second display element 108*b*) comprises the image to be displayed. When the first pixel data and the second pixel data are displayed together, and the frame count data from the first video signal 112*a* (e.g., the first frame count data) is equivalent to the frame count data from the second video signal 112*b* (e.g., the second frame count data), a correct image is displayed.

In some embodiments, the method 600 includes a step 620 of transmitting the frame count signals 126*a-b*, 126*a*(1), 126*b*(1) from the first display element 108*a* and the second display element 108*b* to the first computer 120 or second computer 204. The frame count signals 126*a-b*, 126*a*(1), 126*b*(1) contain frame count data and may be sent from the display elements 108*a-b*, 108*a*(1), 108*b*(1) to the first computer 120 and/or second computer 204. The transmission of the frame count data may be accomplished via any wireline or wireless technology including but not limited to ethernet, USB, Bluetooth, or WIFI technologies.

In some embodiments, the method 600 includes a step 624 of comparing the frame count data, and determining if the display elements 108*a-b* are synchronous. The comparison and determination may be performed by processors 128 in the first computer 120 and/or second computer. For example, a processor 128 in the first computer may receive near instantaneous frame count data from the first display element 108*a* and the second display element 108*b* and compare the two frame counts. If the counts do not match, the system 100 will determine that the first display element 108*a* and the second display element 108*b* are not synchronous.

In some embodiments, the method 600 includes a step 628 of adjusting at least one of a first video stream (e.g., of the first video element 108*a*) or a second video stream (e.g., of the second video element 108*b*) if the first frame count signal 126*a* and the second frame count signal 126*b* are not equivalent (e.g., the first display element 108*a* and the second display element 108*b* are not synchronous). For example, the first computer may delay the first video stream by two frames if a comparison of the frame count signal by the first computer 120 and/or second computer 204 determines that the first video element 108*a* is ahead of the second video element 108*b* by two frames.

The method 600 may be performed by any system 100, 200, 300 as described herein, and may be performed by the first computer 120 alone, or in association with the second computer. For example, instruction in the memory 132 of the first computer 120 may cause one or more of the processors 128 to generate the first video signal and the second video signal; transmit the first video signal to the first display element; transmit the second video signal to the second display element; receive the first frame count data from the first display element; receive the second frame count data from the second display element; and compare the first frame count data to the second frame count data; and adjust at least one of the first video stream or the second video stream if the first frame count data and the second frame count data are not equivalent.

In some embodiments, the system 300 is configured for 3D display. For example, the system 300 may be configured for 3D display and include optical glasses (e.g., spectacles or goggles) configured with optical shutters. For instance, the displays 104a-b or display elements 108a-b of the system may be synchronized with each other and with a pair of optical shutters providing the desired 3D image (e.g., the glasses conferring a three-dimensional image to a user based on a synchronicity of the optical shutters with the first display element 108a and the second display element 108b.

In some embodiments, the frame 400 is also embedded with a frame identifier that is monitored by the first computer 120 and/or second computer 204 to ensure that the correct frames are displayed. For example, a frame 400 for to be shown on a left display element (e.g., display element 108a) may have the term 'left display' embedded into the blanking region of the frame 400.

The system 300 may utilize any video format. For example, the system 300 may utilize ARINC 818 and/or SMPTE 292M video formats commonly used in aviation. The ARINC 818 and SMPTE 282M formats allow for non-pixel data (e.g., ancillary data) to be communicated along with pixel data. For example, the non-pixel data may be communicated to the display 104a-b during the vertical back porch 408 time interval.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    a display configured as a large area display of an aircraft to display an image in a video format, comprising:
        a first display element communicatively coupled to a first computer configured to:
            receive a first video signal of a first video stream, wherein the first video signal comprises:
                first pixel data; and
                first frame count data; and
            transmit the first frame count data;
        a second display element coupled to the first computer configured to:
            receive a second video signal of a second video stream, wherein the second video signal comprises:
                second pixel data; and
                second frame count data; and
            transmit the second frame count data, wherein the first frame count data is correlated to the second frame count data, wherein the first pixel data and the second pixel data comprise image data that, when imaged on the display and the first frame count data and the second frame count data are equivalent, displays the image;
    the first computer comprising:
        one or more processors; and
        a memory with instructions stored thereon, wherein the instructions, upon execution by the one or more processors, cause the one or more processors to:
            generate the first video signal and the second video signal;
            transmit the first video signal to the first display element;
            transmit the second video signal to the second display element;
            receive the first frame count data from the first display element;
            receive the second frame count data from the second display element;
            compare the first frame count data to the second frame count data; and
            adjust at least one of the first video stream or the second video stream if the first frame count data and the second frame count data are not equivalent;
    a second computer communicatively coupled to the first display element and the second display element configured to:
        transmit the first video signal to the first display element;
        transmit the second video signal to the second display element,
        receive the first frame count data from the first display element; and
        receive the second frame count data from the second display element; and
    a cross-talk bus configured to communicatively couple the first computer to the second computer, wherein the second computer is configured to be activated upon a malfunction of the first computer,
    wherein the first video signal is configured to arrange into a first frame comprising:
        an active pixel area configured to include the first pixel data; and
        a blanking region configured to include the first frame count data,
    wherein the blanking region comprises:
        a horizontal back porch;
        a horizontal front porch;
        a vertical front porch; and
        a vertical back porch; wherein the first frame count data is included in at least one of the horizontal back porch, the horizontal front porch, the vertical front porch, or the vertical back porch,
    wherein the frame count data includes a frame number,
    wherein the frame number is based on a frame count word size, wherein the frame count word size is configured in a range from 1 bit to 16 bits.

2. The system of claim 1, wherein the video format is configured as a ARINC 818 video format or a SMPTE 292M video format.

3. The system of claim 1 further comprising spectacles configured with optical shutters synchronized with the first display element and the second display element, wherein the spectacles are further configured to confer a three-dimensional image to a user based on a synchronicity of the optical shutters with the first display element and the second display element.

4. A method to synchronize a display configured with two display elements comprising:
  generating first pixel data for a frame of a first video signal and second pixel data for a frame of a second video signal, wherein the first video signal and the second video signal are synchronized;
  storing synchronized frame count data into a blanking region of each frame;
  transmitting, via a first computer, the first video signal to a first display element and the second video signal to a second display element;
  displaying the pixel data on the first display element and the second display element, wherein the display comprising the first display element and the second first display element is configured as a large area display of an aircraft;
  transmitting the frame count signals from the first display element and the second display element to the first computer or second computer;
  comparing the frame count data and determining if the first display element and the second display elements are synchronous;
  adjusting at least one of a first video stream or a second video stream if the first display element and the second display element are not synchronous,
  activating the second computer based upon a malfunction of the first computer; and
  performing, via a second computer communicatively coupled to the first display element and the second display element:
    transmitting the first video signal to the first display element;
    transmitting the second video signal to the second display element,
    receiving the first frame count data from the first display element; and
    receiving the second frame count data from the second display element; and wherein a cross-talk bus is configured to communicatively couple the first computer to the second computer,
  wherein the first video signal is configured to arrange into a first frame comprising:
    an active pixel area configured to include the first pixel data; and
    a blanking region configured to include the first frame count data,
  wherein the blanking region comprises:
    a horizontal back porch;
    a horizontal front porch;
    a vertical front porch; and
    a vertical back porch; wherein the first frame count data is included in at least one of the horizontal back porch, the horizontal front porch, the vertical front porch, or the vertical back porch,
  wherein the frame count data includes a frame number,
  wherein the frame number is based on a frame count word size, wherein the frame count word size is configured in a range from 1 bit to 16 bits.

5. The method of claim 4, wherein comparing frame count data includes comparing frame count data received on the first computer with frame count data received on the second computer.

6. The method of claim 4, further comprising synchronizing the first display element and the second display element to a pair of optical shutters.

* * * * *